Figure 1:
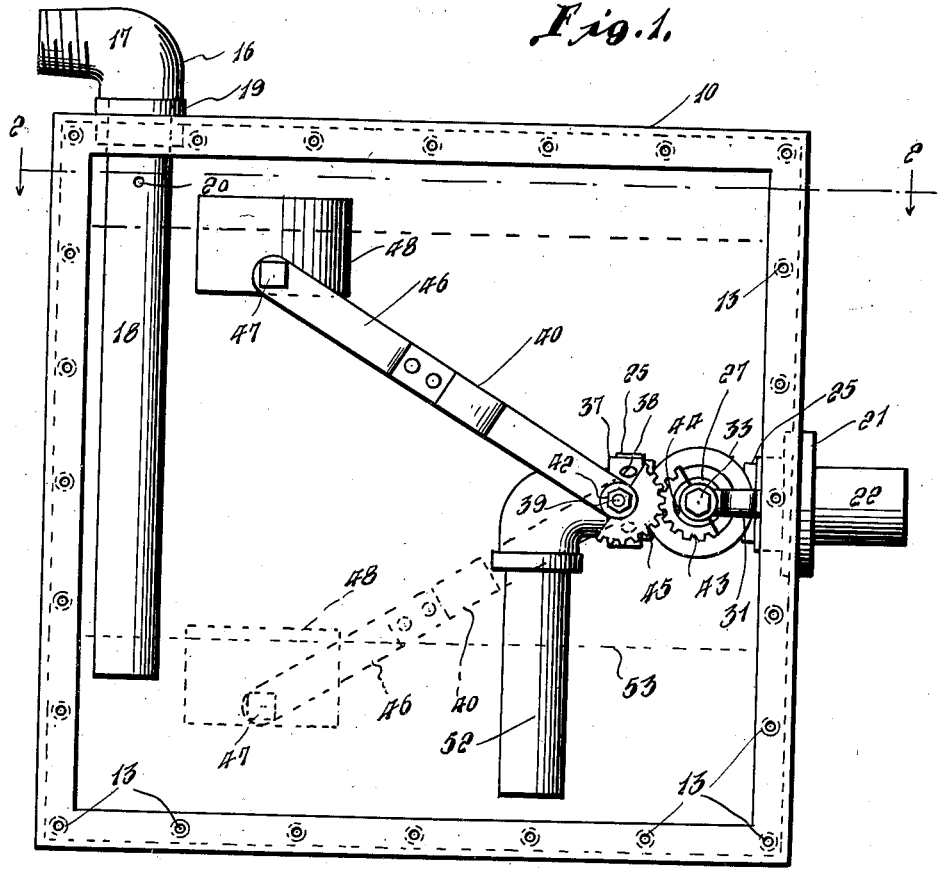

Nov. 18, 1941. E. E. HAGERTY 2,263,494
AUTOMATIC AIR ELIMINATOR FOR GRAVITY FLOW LINES
Filed Aug. 8, 1940 2 Sheets-Sheet 1

Inventor
Elam E. Hagerty
By [signature]
Attorney

Nov. 18, 1941.   E. E. HAGERTY   2,263,494
AUTOMATIC AIR ELIMINATOR FOR GRAVITY FLOW LINES
Filed Aug. 8, 1940   2 Sheets-Sheet 2
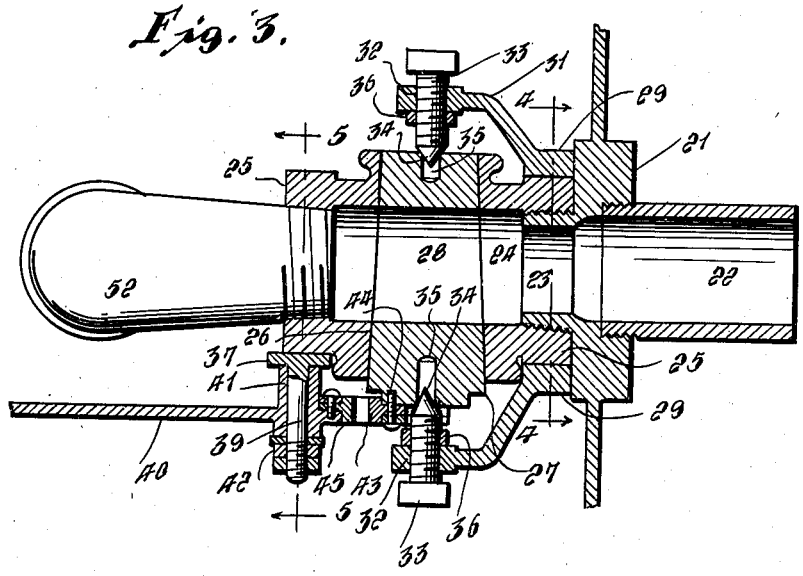
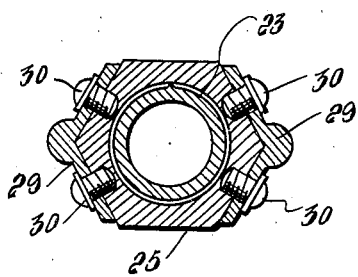
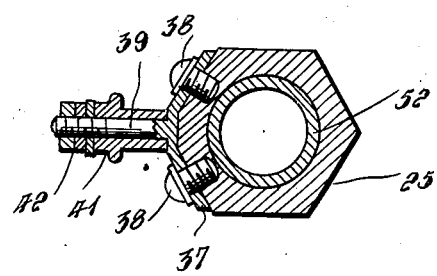
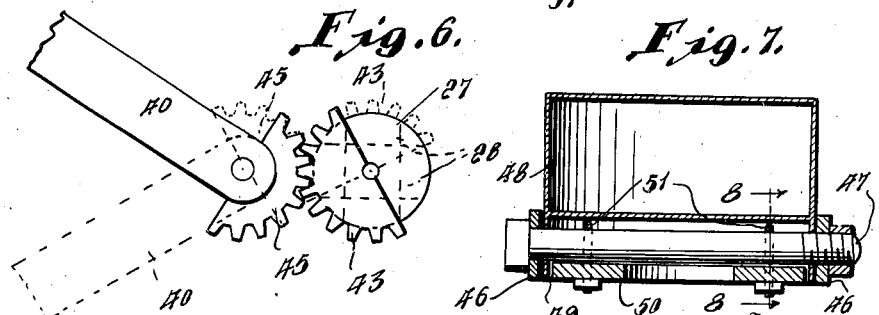
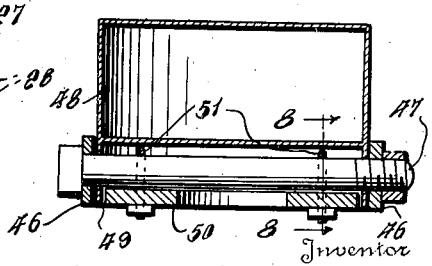
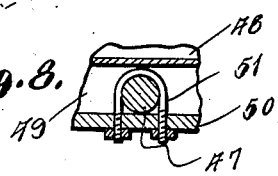
Inventor
Elam E. Hagerty
Attorney Patented Nov. 18, 1941

2,263,494

UNITED STATES PATENT OFFICE 2,263,494

AUTOMATIC AIR ELIMINATOR FOR GRAVITY FLOW LINES

Elam E. Hagerty, Ellinwood, Kans.

Application August 8, 1940, Serial No. 351,800

3 Claims. (Cl. 137—68)

This invention relates to a device adapted to be employed as an attachment for gravity flow lines leading from storage tanks to a gathering station and adapted to provide means for preventing air being drawn into the flow line when the tanks from which the oil is being drawn are empty.

Crude oil is gathered from the field through a gravity flow line which runs gradually down hill from a plurality of storage tanks to what is known as a gathering station. The gathering station is usually equipped with suction pumps which exert a vacuum pull on the flow line to increase the speed of flow of the oil. It is the practice of a field gauger when there is a demand for oil to be run to a gathering station for a producer, to go into the field and open valves on several storage tanks scattered over the field and which are connected to a flow line leading to the gathering station. When these tanks have been drained into the gravity flow line, there is no one available to promptly close the valves and as a result air is pulled into the line and follows the oil down the line until the line is filled air. When other tanks of oil are turned on into the flow line the oil will back up behind the air which, in seeking its highest level through the fluid will move up the line against the oil to retard the flow of the oil and even stop the flow completely.

It is therefore a primary aim of this invention to provide means for shutting off the passage through the gravity flow line automatically before the air can be drawn through behind the oil to thereby materially increase the efficiency of the operation of the conduit.

More particularly, it is an aim of the invention to provide a vessel disposed in the flow line, adjacent to the storage tanks and into which adjacent ends of the flow line open, so that the oil passing through the flow line must pass through the vessel which is sealed except for its connection with the pipes forming the adjacent ends of the flow line; said vessel having means for shutting off the flow of oil from the vessel to the line leading to the gathering station before the oil level in the vessel falls below the level of the end of the pipe section, which is disposed in the vessel and which leads therefrom to the gathering station, so that air cannot be drawn through said section of the flow line.

Still another aim of the invention is to provide improved shut off means for the last mentioned section of the flow line including a valve having a movable valve body adapted to be actuated by a float and mounted to turn freely relatively to a valve housing to avoid friction and to insure prompt action of the valve in response to changes in the level of the liquid in the vessel so that a vessel of comparatively small capacity may be employed for a relatively large flow line.

Figure 2:
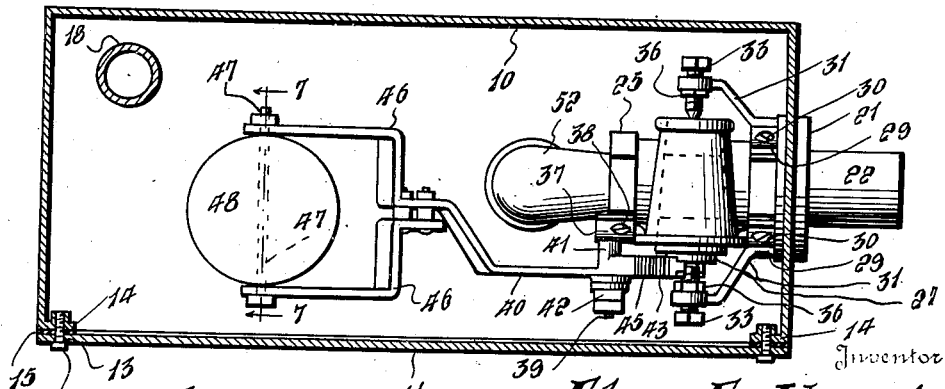

Other objects and advantages of the invention will hereinafter become more fully apparent from the following description of the drawings, which illustrate a preferred embodiment thereof, and wherein:

Figure 1 is a side elevational view of the invention with the detachable side wall of the vessel removed for showing the parts disposed in the vessel, Figure 2 is a horizontal sectional view taken substantially along the plane of the line 2—2 of Figure 1 and showing the removable wall applied, Figure 3 is an enlarged horizontal central sectional view partly in top plan showing in detail the valve construction, Figures 4 and 5 are transverse vertical sectional views taken substantially along the planes of the lines 4—4 and 5—5, respectively of Figure 3, Figure 6 is a diagrammatic view of the connection between the float and the rotatable valve body, Figure 7 is a vertical sectional view, on an enlarged scale, taken substantially along the plane of the line 7—7 of Figure 2, and Figure 8 is a vertical sectional view taken substantially along the plane of the line 8—8 of Figure 7.

Referring more particularly to the drawings, wherein like reference characters designate like or corresponding parts throughout the different views, 10 designates a vessel or container which is adapted to be disposed in an upright position and which is provided with a side 11 which is removable and which is secured in position by means of nut and bolt fastenings 12 which extend through alined apertures 13 in the side 11, in a flange 14 and a sealing gasket 15. Side 11 is removable to provide access to the interior of the vessel 10 for the repair, replacement or adjustment of the parts disposed therewithin and which will hereinafter be described. The gasket 15 is provided for effectively sealing the vessel 10 when the side 11 is in position.

The vessel 10 is sealed except for two pipes which extend into the vessel. One of the pipes, designated 16, extends into the vessel 10 through the open top thereof and opens into the vessel adjacent its bottom. The pipe 16 preferably includes the sections 17 and 18 which connect in any suitable manner with a collar 19 formed in the top of the container 10, the section 17 leading from the vessel 10 to a plurality of storage tanks, not shown, and the section 18 extending downwardly into the container 10. The section 18 is provided with a vent port 20 which is disposed adjacent the top of the vessel 10. As best seen in Figure 3, a collar 21 is formed integral with one of the permanently fixed side walls of the vessel 10 and is provided with a bore extending therethrough and having an internally threaded outer end for engaging the externally threaded end of a pipe 22 which leads from the vessel 10 to the gathering station, not shown.

The collar 21 is provided with an externally threaded nipple 23 which extends inwardly of the container 10 and which connects with one of the internally threaded ends of a passage 24 of a valve housing or casing 25 which is disposed within the vessel 10. The valve casing 25 is provided with a transverse bore 26 which extends therethrough and which crosses the passage 24. Bore 26 tapers from one end to the opposite end thereof and is adapted to receive a valve body or core 27 which is shaped to fit snugly in the bore 26 and which is provided with a transverse opening 28 to aline with the passage 24 when the body 27 is in one position.

As best seen in Figure 4, a pair of base plates 29 are detachably secured to opposite sides of one end of the valve casing 25 by fastenings 30. A pair of corresponding arms 31 are formed integral with and mounted by the plates 29. The free ends of the arms 31 are disposed beyond and in alinement with the transverse bore 26. Said free ends are provided with threaded openings 32 to receive set screws 33 having the tapered ends 34 which are adapted to engage recesses 35 in the ends of the valve body or core 27 to form bearings for journaling the core 27. Set screws 33 are provided with lock nuts 36 for retaining them in adjusted positions.

As best seen in Figure 5, a base plate 37 is detachably secured to the outer side of the casing 25, adjacent its opposite, inner end by means of fastenings 38. A stub shaft 39 is formed integral with and projects from the outer side of the base plate 37. A lever 40 is provided with a bearing 41 adjacent one end thereof which is journaled on the shaft 39 and retained in position by means of the nuts 42. A gear segment 43 is attached to the larger end of the core 27 by means of one or a number of fastenings 44 and a similar gear segment 45 is attached in the same manner to the end of the lever 40 which is provided with the bearing 41. The gear segments 43 and 45 mesh so that when the lever 40 is swung downwardly its gear segment 45 will be swung upwardly to swing the gear segment 43 upwardly to rotate the core 27, in a clockwise direction as seen in Figure 1, to turn it so that its opening 28 will move out of a registering position with the passage 24. The opposite end 46 of the lever 40 is forked or bifurcated, as best seen in Figure 2.

A bolt 47 extends through the outer ends of the prongs or furcations of the bifurcated end 46 for pivotally mounting a float body 48, which is preferably in the form of a hollow metal container. Float body 48 is provided with the depending apertured flanges 49 which loosely engage the bolt 47, as best seen in Figure 7, for pivotally connecting the float to the lever 40. A weight, in the form of a ring 50 is attached to the bolt 47 by the fastenings 51 to provide sufficient weight to insure that the lever 40 will be swung downwardly when the level of the liquid in the vessel 10 drops. A pipe section 52, forming a part of the conduit section 22 is connected to the opposite, inner end of the bore 24 and extends inwardly and downwardly relatively to the vessel 10 and opens adjacent the bottom thereof.

From the foregoing it will be obvious that when the valves of tanks to which the end 16 of the flow line is connected are opened, oil will flow through sections 17 and 18 thereof and into the vessel 10. Assuming that when the flow starts the level of the oil in the vessel 10 is at the point indicated by the line 53, as the oil flows into the vessel 10 the air in the vessel above the line 53 will be forced outwardly through the vent 20 and back to the tanks from which the oil is being drawn. When the level of the liquid is at the point indicated by the line 53 the float 48 and lever 40 will be in its dotted line position, as seen in Figure 1, in which position the core or valve body 27 will be closed so that its passage 28 will be at right angles to the position, as seen in Figure 3. When the oil flows into the vessel 10 the level of the oil in the vessel will rise causing the float 48 to move upwardly for raising the arm or lever 40 to thereby turn the valve body 27 in a counterclockwise direction to an open position with its passage 28 in communication with the passage 24. This will permit the oil to flow upwardly through pipe 52, through the valve casing 25 and the collar 21 into conduit pipe 22 from where it will flow to the gathering station. When the supply of oil from the open tanks has been exhausted the oil will continue to flow from the vessel 10 to the gathering station, as just previously explained, until the supply of oil in vessel 10 falls to the level indicated by line 53 at which time the float 48 and arm 40 will have returned to their dotted line positions for closing the passage through valve casing 25 so that the oil level will never drop below the open end of the pipe 52. As a result, no air can be drawn from vessel 10 into the conduit pipe 22 behind the oil. The air will be drawn through the conduit section 16 and into the vessel 10 through the vent 20 after the oil has ceased to flow into the vessel and before the level of the oil has dropped to the line 53 to vent the vessel 10 while the liquid level of the oil in the vessel 10 is falling to the level of line 53. The pipe section 18 extends down and opens below the liquid level line 53 so that the oil from the tanks entering the vessel 10 will be discharged into the vessel below the lowermost oil level thereof to reduce agitation or turmoil of the oil in the vessel 10.

The valve body or core 27 is journaled by the bearings 34 and by means of which the core is mounted freely in the casing 25 and to prevent the weight of the core 27 and any pressure that might be caused by the meshing of the gear segments 43 and 45 from causing the core to bind against any portion of the bore 26. The set screw 33, disposed adjacent to the restricted end of the bore 26, is adjusted so that the core 27 can be inserted to a point where it will fit snugly to prevent leakage but will still not bind in the bore 26 so that it can turn freely, after which the other set screw 33 is tightened to retain the core 27 thus positioned. By thus providing a free floating core or valve body 27 which can be turned freely, the size of the vessel 10 can be reduced while still insuring that the valve will close promptly when the liquid level reaches the line 53 so that there will be no danger of the lower end of the pipe 52 being exposed to the air.

The valve structure, as disclosed in Figure 3, could obviously be used for other purposes than the purpose illustrated. For example, by moving the gear segment a quarter of a turn relatively to the core 27 the construction would operate in an opposite manner or in other words as the float 48 and lever 40 moved downwardly the valve body 27 would move from a closed position to an open position and conversely when the float and lever moved upwardly. When thus arranged, the valve could be connected to the supply pipe of an oil or water tank to shut off the supply to the tank when the tank was filled and to admit the liquid when the tank was empty or partially empty. It could likewise be used for many other purposes when thus arranged as for example to regulate the fuel level in the fuel pot of a stationary Diesel engine.

Various modifications and changes in the construction and arrangement of the parts forming the invention are contemplated and may obviously be resorted to as only a preferred embodiment of the invention has been disclosed.

I claim as my invention:

1. An attachment for gravity flow lines comprising a closed vessel, a pipe leading from a source of supply of a liquid and extending into the vessel through the top thereof and opening adjacent the bottom of the vessel, said pipe having a vent opening communicating with the vessel adjacent its top, a pipe leading away from the vessel and having one end opening in the vessel adjacent the bottom thereof, a valve for closing the last mentioned pipe, and a float, for actuating the valve, disposed in the vessel and actuated by the liquid level therein to close the valve when the liquid falls to a certain level to prevent the liquid from falling below the open end of the last mentioned pipe which is disposed within the vessel.

2. An attachment for gravity flow lines of oil conduits comprising a vessel interposed in a flow line, a pipe forming one end of the flow line having an end extending into the vessel through the top thereof and opening adjacent the bottom of the vessel, said pipe leading from a source of supply, a conduit leading from the vessel, said conduit having one end disposed in the vessel and opening adjacent the bottom thereof, float controlled valve means for closing the passage of said conduit for regulating the variation in the liquid level in the vessel and to prevent the level of the liquid in the vessel from dropping below the level of the aforementioned end of the conduit, and means for venting the vessel through said pipe, said vent means being located above the extreme high liquid level of the vessel.

3. An automatic control attachment for gravity flow lines of oil conduits comprising a vessel interposed in a flow line and through which all the liquid passes from one end of the flow line to the opposite end thereof, means actuated solely by the liquid level in the vessel for controlling the flow of the liquid from the vessel to the outlet end of the flow line to prevent air from being drawn into the last mentioned end of the flow line when the flow to the vessel from the inlet end of the flow line ceases, said vessel being closed except for the connections to the ends of the flow line, and means for venting the vessel through the inlet end of the flow line and from a point above the liquid level in the vessel and substantially above the level at which the liquid is discharged from the inlet end of the flow line into the vessel.

ELAM E. HAGERTY.